(12) United States Patent
Mikkonen et al.

(10) Patent No.: US 6,501,741 B1
(45) Date of Patent: Dec. 31, 2002

(54) METHOD SUPPORTING THE QUALITY OF SERVICE OF DATA TRANSMISSION

(75) Inventors: Jouni Mikkonen, Tampere (FI); Juha Ala-Laurila, Tampere (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/237,513

(22) Filed: Jan. 26, 1999

(30) Foreign Application Priority Data

Jan. 28, 1998 (FI) ................................................ 980191

(51) Int. Cl.[7] ................................................ H04Q 7/00
(52) U.S. Cl. ...................................... 370/310; 370/468
(58) Field of Search ................................ 370/400–402, 370/395.1, 395.2, 395.21, 395.42, 395.43, 310.1, 310.2, 310, 321, 328–330, 337, 347, 395, 65, 351, 352

(56) References Cited

U.S. PATENT DOCUMENTS

| 5,175,758 A | | 12/1992 | Levanto et al. | 379/57 |
|---|---|---|---|---|
| 5,752,193 A | * | 5/1998 | Scholefield et al. | 370/329 |
| 5,787,341 A | | 7/1998 | Parkas et al. | 455/90 |
| 5,797,102 A | | 8/1998 | Hallikainen et al. | 455/557 |
| 5,799,255 A | | 8/1998 | Berg et al. | 455/551 |
| 6,031,832 A | * | 2/2000 | Turina | 370/348 |
| 6,052,594 A | * | 4/2000 | Chuang et al. | 370/330 |
| 6,104,929 A | * | 8/2000 | Josse et al. | 370/379 |
| 6,134,230 A | * | 10/2000 | Olofsson et al. | 370/337 |
| 6,215,776 B1 | * | 4/2001 | Chao | 370/316 |
| 6,216,006 B1 | * | 4/2001 | Scholefield et al. | 455/422 |
| 6,356,553 B1 | * | 3/2002 | Nagami et al. | 370/397 |

FOREIGN PATENT DOCUMENTS

| EP | 0 768 777 A2 | 4/1997 |
|---|---|---|
| WO | WO 97/36405 | 10/1997 |
| WO | WO 99/05828 | 2/1999 |
| WO | WO 99/16266 | 4/1999 |

OTHER PUBLICATIONS

"Resource ReSerVation Protocol (RSVP)—Version 1 Functional Specification" by Braden et al.; RFC 2205, Sep. 1997.

* cited by examiner

Primary Examiner—David Vincent
(74) Attorney, Agent, or Firm—Perman & Green, LLP

(57) ABSTRACT

The invention relates to a method for supporting the quality of service (QoS) in packet data transmission between a wireless communication device (1) communicating with a radio network, and an information network (LN), where data transmission between the wireless communication device (1) and the radio network (2) is controlled with at least one access point controller (5, 5', 5"). Further, in the method, information is transmitted between the wireless communication device (1) and the access point controller (5, 5', 5") in radio flows. In the method, at least one radio flow is provided with a defined radio flow identification (RFID) and a quality of service (QoS).

14 Claims, 9 Drawing Sheets

METHOD SUPPORTING THE QUALITY OF SERVICE OF DATA TRANSMISSION

The present invention relates to a method as set forth in the preamble of the appended claim 1 for supporting the quality of service of data transmission in wireless communication according to the Internet protocol, a system as set forth in the preamble of the appended claim 8, and a wireless communication device as set forth in the preamble of the appended claim 14.

The International Standardisation Organisation ISO has developed an open system interconnection (OSI) model for describing the distribution of data transmission in different layers. The layers are, listed from top downwards, an application layer, a presentation layer, a session layer, a transport layer, a network layer, a data link layer, and a physical layer. In view of the present specification, the most essential layers are the physical layer, the data link layer and the application layer.

The European Telecommunication Standards Institute ETSI has defined a standard for a wireless local area network (ETS 300 652), HIPERLAN Type 1 (high performance radio local area network) to be applied e.g. in wireless local area networks of short distances, such as local area networks of offices. In a local area network according to this standard, several devices may be connected which communicate on the same data transmission channel using packet data transmission. The standard defines the two lowermost layers of said OSI model: the physical layer and the data link layer.

Figure 1A:
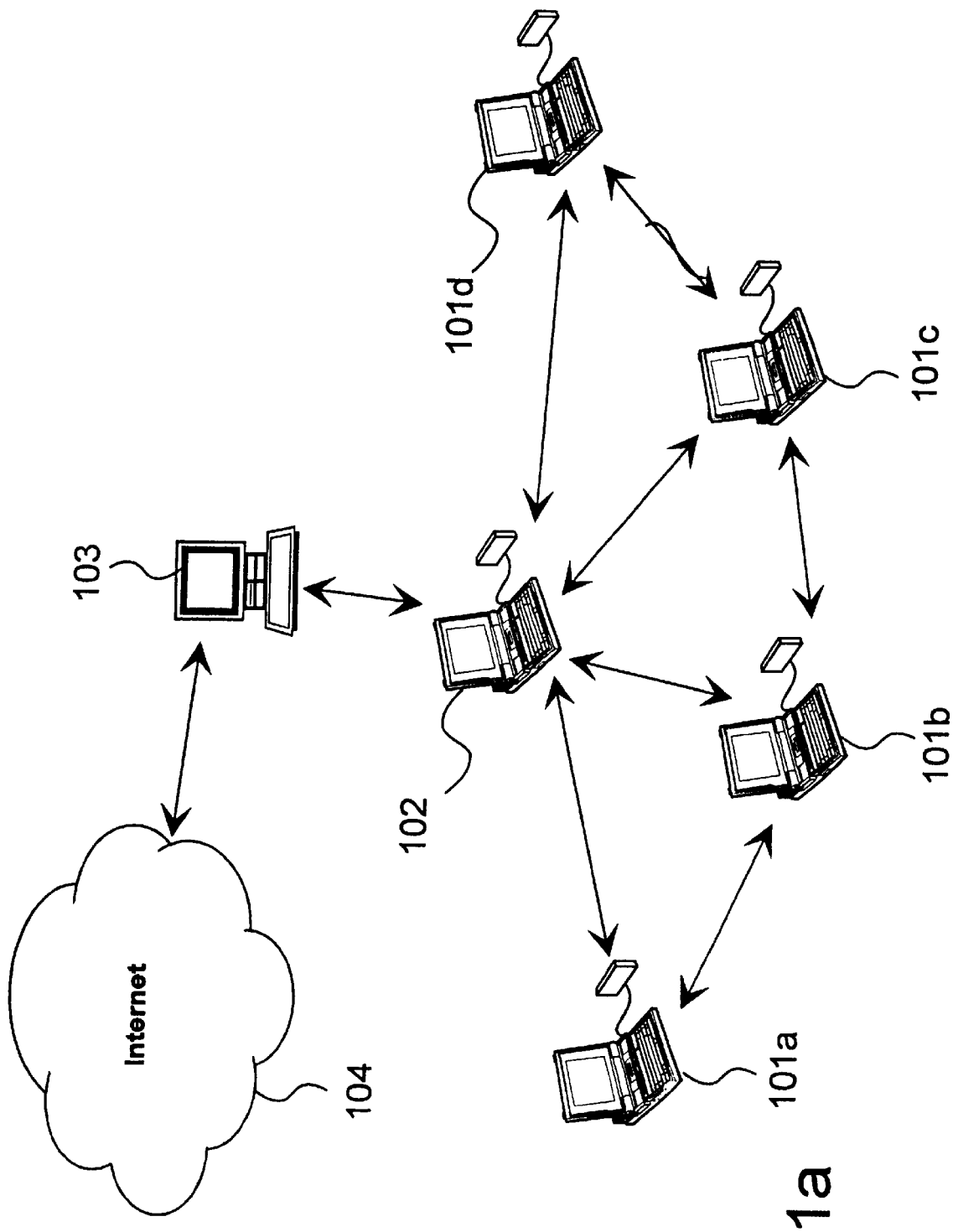

The Conference of European Post and Telephone Administrations CEPT has defined a standard TR 22-05 where the frequency range from 5.15 GHz to 5.3 GHz is reserved for data transmission according to the HIPERLAN standard. This frequency range is divided into five channels, each of which being allotted a band width of ca. 23.5 MHz. FIG. 1a shows a reduced example of such a local area network according to the HIPERLAN standard. It consists of terminal nodes 101a, 101b, 101c, 101d, a switching node 102 and a gateway node 103. The terminal nodes 101a–101d may communicate directly with each other, or they may communicate via the switching node 102 if there is no direct radio communication between the terminal nodes 101a–101d due to e.g. too long a distance or obstacles dampening radio signals. Via the switching node 102, the terminal nodes 101a–101d can also communicate with the gateway node 103 which is coupled to e.g. a wireless local area network 104 or the Internet network. Thus, the terminal node 101a–101d can be used as an Internet host, if necessary.

Figure 1B:
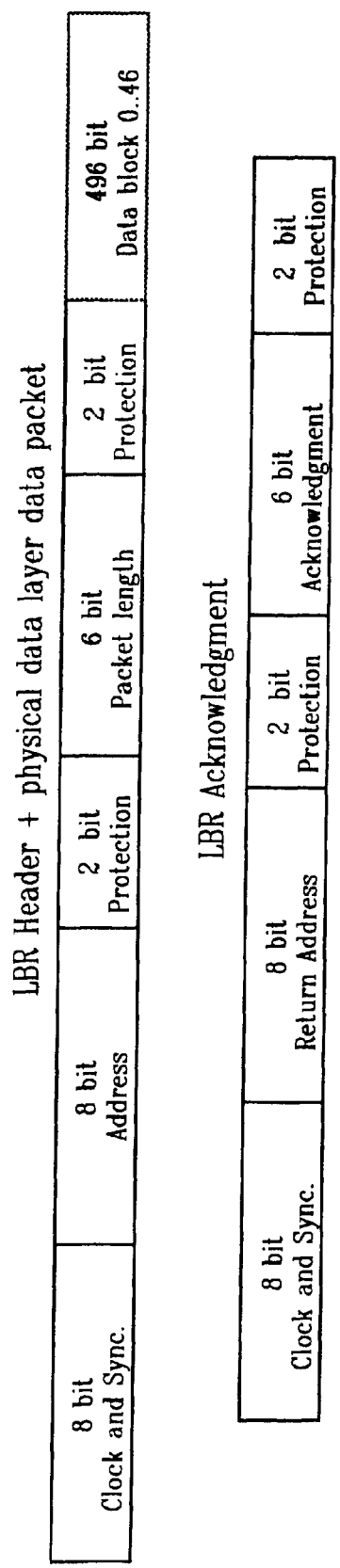

FIG. 1b shows the structure of a data transfer packet according to the HIPERLAN standard. First, there is a header which is transmitted at a lower bit rate (LBR) than the other blocks and which includes the address information and the length of the packet. This is followed by a synchronisation block for synchronising the receiver to the data blocks of the packet DB(1), DB(2), . . . , DB(m) containing the actual information to be transmitted. One packet may contain a maximum of 47 data blocks. Each packet can be addressed to either one receiver (unicast packet) or several receivers (multicast packet). As the third packet type the HIPERLAN standard defines an acknowledgement packet (ACK) by which the receiver of the packet informs about the successful receipt of the packet so that the sender will know if there is a need to retransmit the packet. In packets requiring data transmission in real time, it can be defined that the receipt of the packet is not acknowledged, because the information contained in the packet could be outdated if retransmitted. Packets of this kind are, for instance, packets for audio applications. On the other hand, for some real-time applications with higher quality demands, such as video applications, it is possible to define limited packet acknowledgement, whereby the acknowledgement is transmitted for several packets with one message. In packets not requiring real time, it is possible to define the acknowledgement to be sent after the receipt of each packet.

The transmission and receipt take place on the same channel without external synchronisation. The channel is listened to by the receiver of the transmitting node for a certain time, and if no communication is detected on this channel within this time, it is assumed that the channel is free and transmission is started. However, if communication is detected on this channel, the receiver is synchronised with this transmission. After the transmission, a possible acknowledgement message is waited for, and after this, an attempt for obtaining the channel can be started.

However, there may be several nodes waiting for transmission turns, whereby it may occur that several terminal devices try to transmit simultaneously. This can be solved e.g. so that the nodes are allotted different priorities, whereby a node with a lower priority will wait a longer time after the end of a transmission before it starts to transmit, if no communication is detected on the channel within this time.

The term "Internet" is commonly used to describe an information resource from which information can be retrieved from a data processor, such as a personal computer (PC). The data processor communicates via a modem with a telecommunication network. This information resource is distributed world-wide, comprising several storage locations which also communicate with the telecommunication network. The Internet is made operable by defining certain data communication standards and protocols, such as TCP (transfer control protocol), UPD (user datagram protocol), and IP (Internet protocol), which are used for controlling data transmission between numerous parts of the Internet. The TCP and the UDP are involved with preventing and correcting data transmission errors in the data transmitted in the Internet; the IP is involved with data structure and routing. The currently used versions of the Internet protocol are IPv4 and IPv6.

Thanks to the growing popularity of open data systems, the Transmission Control Protocol/Internet Protocol (TCP/IP) communication protocol has become a generally used protocol whereby computers of different sizes and brands can communicate with each other. TCP/IP support is currently available for almost all operating systems. The network layer protocol of TCP/IP, the Internet Protocol IP, is intended to be routed by gateways, i.e. routers. The routing is conducted by means of IP addresses of four bytes and routing tables. Thanks to the Internet protocol, computers using the TCP/IP can transfer messages in the routing network even to the other side of the world.

The Internet, which covers well particularly the industrialised countries, is a huge network of routers using the TCP/IP communication protocol. The largest group of users of the Internet, which was originally in scientific use only, is now firms which buy their services from commercial connection providers. In the Internet, each device has its own individual IP address. In the Internet protocol version IPv4, the IP address consists of 32 bits, i.e. it is a digit of four bytes which is divided in two parts: an organisation-specific network address and a network-specific device address. For facilitating the processing of addresses, a decimal dot notation system has been introduced, in which the addresses are indicated by digits of 8 bits separated by dots (an octet). One octet is a number from 0 to 255. This address mechanism is further divided into three different classes (ABC) which make network and device addresses of different lengths possible.

Figure 2:
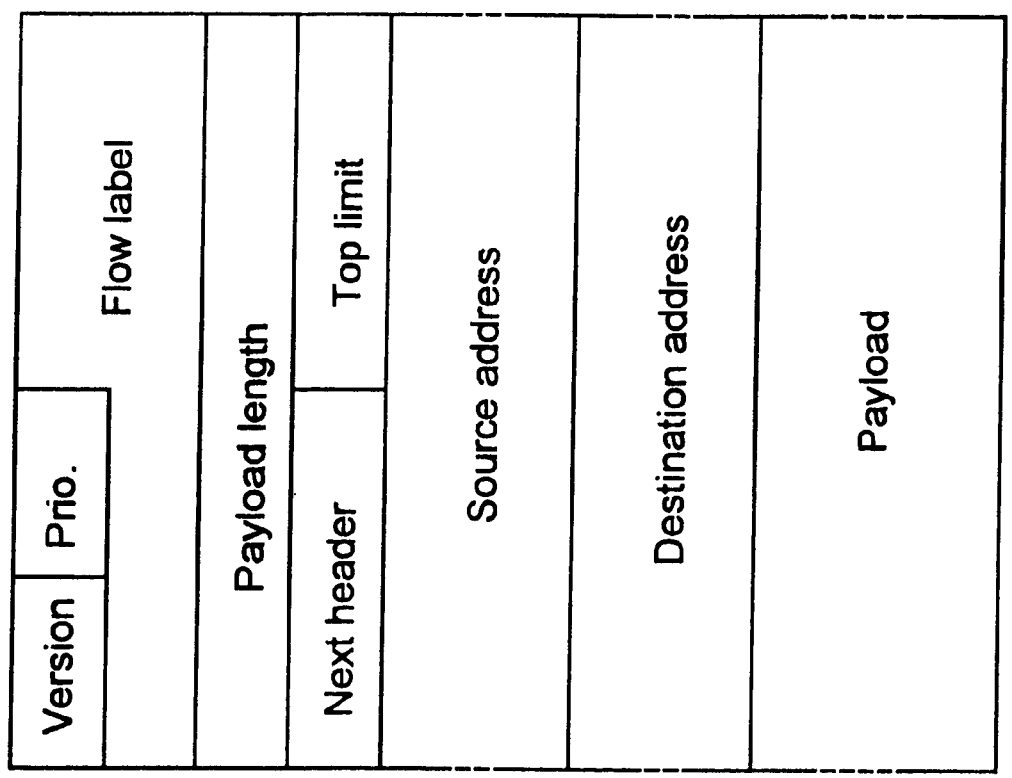

Further, with the growing popularity of the Internet, the length of the address blocks in the data packets of Internet messages is no longer sufficient in all situations for indicating all the addresses in use. This is one reason for developing the Internet protocol version IPv6. In this protocol version, the length of the address blocks is increased to 128 bits, which means in practice that an individual address can be reserved for all devices that are connected with the Internet network. FIG. 2 shows the blocks of the data packet in Internet messages.

The header block consists of the following elements:

Version IP version of 4 bits (=6)

Prio. 4 bit priority,

Flow label 24 bit label for identifying the connection in the application layer, Payload length 16 bit integer indicating the length of the payload, i.e. the length of the packet after the header in bytes, Next header data of 8 bits determining the header immediately following the IPv6 header, Top limit integer counter of 8 bits which is reduced by one at the each device (node) which transmits the packet further; the packet is rejected if the value is reduced to zero, Source address the 128 bit address of the sender of the original packet, Destination address the 128 bit address of the intended recipient.

The header is followed by the payload block, i.e. the actual information to be transmitted.

Physically, the Internet consists of communication network arranged in a hierarchy, for example local area networks (LAN), regional telecommunication networks, and international telecommunication networks. These communication networks are coupled internally and externally with routers which transmit information from the transmitting terminal equipment or from the preceding router in the chain of data transmission, and route the information to the receiving terminal equipment or to the next router in the chain of data transmission.

Figure 3:
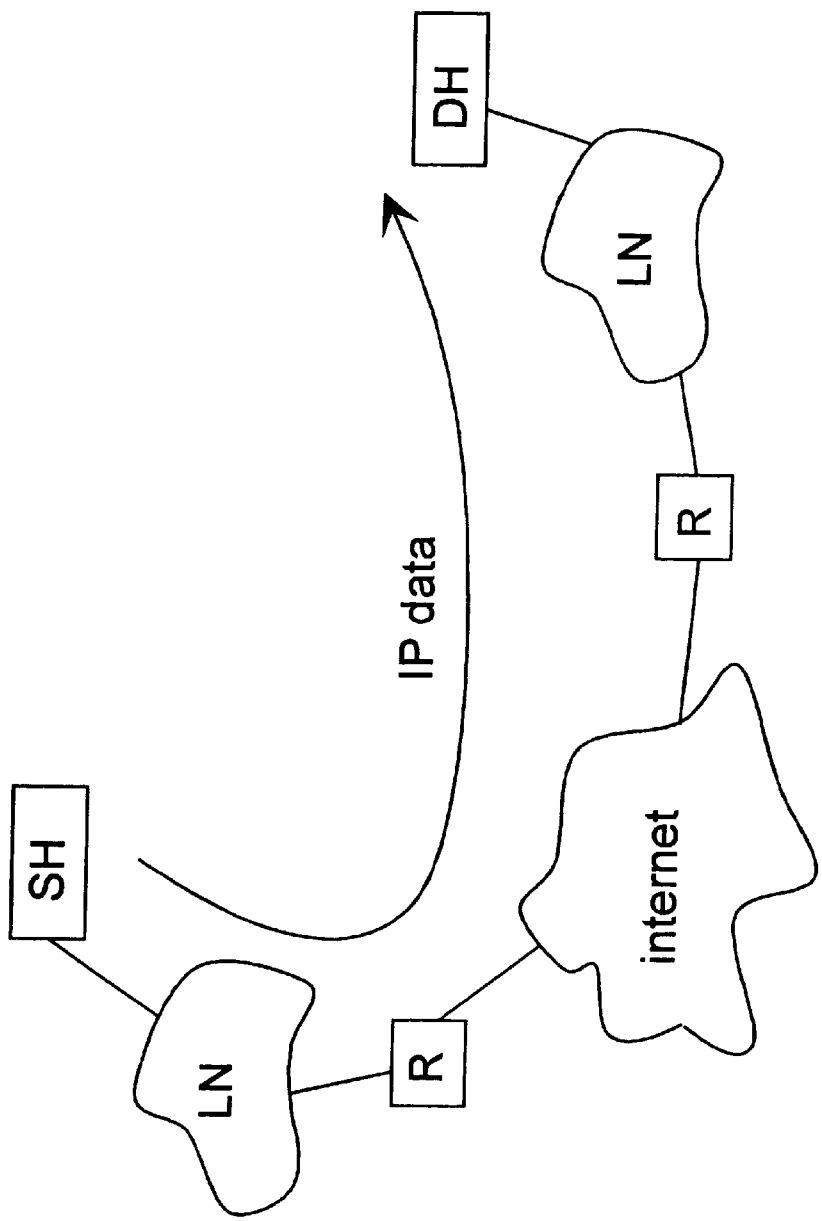

FIG. 3 shows the coupling of the transmitting terminal equipment (source host, SH) and the receiving terminal equipment (destination host, DH) to the Internet via corresponding local area networks LAN and routers R.

Below in this specification, the transmitting terminal equipment and receiving terminal equipment will also be called by the common term Internet host. The Internet host can be typically used either as the source host SH and the destination host DH.

An Internet host, coupled to the Internet network via a local area network LAN, is either provided with a permanently defined Internet address or the address is a dynamic address generated by the server of the local area network (for example by using a dynamic host configuration protocol DHCP). In case the Internet host is coupled by a modem to a telecommunication network, the telecommunication terminal must ask for an Internet address from an Internet service provider to which the Internet host is registered. This is conducted e.g. according to a point-to-point protocol (PPP) formed above the Internet protocol layer. In both cases, the information to be transmitted in the Internet is routed to the Internet host possibly via several communication networks and routers from a remote host by using a determined Internet address.

The IP defines the transmission of the communication in packets (datagrams). The packet data transmission is one reason for the popularity of the Internet, because it allows transmission in bursts which does not require constant on-line connection and makes it possible that several Internet hosts are coupled in the same telephone connection. When a router receives a packet containing a destination address, the router routes the packet forward, if there is free capacity in the buffer memory of the router and at least one open telephone line. If there is not sufficient memory space or no open telephone line available at the moment, the packet is rejected and the source host or the preceding router must try retransmission later. In general, the Internet does not support timecritical data transmission, and the method of best effort offered by the Internet protocol is sufficient.

In the transmission of packets according to the Internet protocol, the packets can be transmitted directly to the receiver only when the network elements of the addresses of both the host and the destination are the same. In other cases, the packets are transmitted to a router which takes care of transmitting the packets further, either to the next router or to the destination, if the recipient is in the network of the router. In each router, each packet entering the router is transferred from the data link layer according to the OSI model to the network layer, where the header of the packets is examined, and on the basis of the address data therein, a decision is made where the packet is to be transmitted. For transmission, the packets are transferred back to packets of the communication layer. Because the Internet protocol has the character of a connectionless protocol, the above-mentioned operations must be taken for each packet entering the router. If the communication layer is fast, for example in accordance with the asynchronous transfer mode ATM, the processing of the packets takes a significant part of the time used for transmission. Thus, the whole transmission capacity of the transfer line cannot be utilised effectively. For correcting this situation, e.g. Ipsilon Networks has developed a coupling solution. In this solution, an attempt is made to detect time-consuming data transmission flows and to couple them directly with a communication layer.

The coupling solution by Ipsilon Networks consists of switches and controllers for controlling their operation. When a continuous communication flow is detected by the controller in any protocol communication in the Internet, the controller requests the transmitter to label the packets of said communication flow with a flow label, i.e. to open a so-called virtual channel for this communication flow. If the same finding is made by the receiver, also it requests for separation of the communication flow onto a separate virtual channel. Subsequently, this controller between the transmitter and the receiver may locally control their own switch to turn on direct communication between these two virtual channels. Because the presented coupling solution is based on labelling communication flows, it contains for each label a defined time limit after which the label is rejected, if there is no longer communication on the channel labelled by it. This reduces the number of different labels required simultaneously. In this solution, the coupling is made on the basis of communication between three nodes, and the switching request is made by the sender and/or the receiver. The coupling reduces primarily the delay of data transmission in comparison with routing.

This coupling solution is only intended for accelerating routing of packets according to the Internet protocol, and this coupling solution requires that three nodes are involved. This solution does not consider the quality of service as such.

Data transmission in packet form improves the degree of capacity utilisation of the communication channel in general, not only for retrieving information from the Internet. For example, packet data transmission can be used in applications, such as voice calls, video negotiations and other communications according to different standards. However, some of these applications are time-critical. For example in a real-time voice call, the service of best effort offered by the Internet protocol may cause significant delays in the transmission and transfer of the audio signal, which affects the understanding of the received audio signal so that e.g. speech is almost or totally unintelligible. Moreover, the delay (the time consumed from the transmission to the receipt of the packet) may vary during the transmission of the audio signal, depending on e.g. the load of the communication network and variations in transmission errors. The same applies also to the transmission of a video signal in real time. There may also be situations where the users of Internet do not want as long delays as occur in many cases for obtaining information from the Internet.

The Internet Engineering Task Force (IETF) is an organisation involved with the development of Internet architecture and operation in the Internet. The IETF is currently developing a new protocol which provides an Internet host the possibility to request a desired quality of service from available defined qualities of service (QoS). This protocol is known as the resource reservation protocol (RSVP), and it is presented in the standard proposition "Resource ReSerVation Protocol (RSVP)—Version 1 Functional Specification" by Braden, R.; Zhang, L.; Berson, S.; Herzog, S.; Jamin, S.; RFC 2205, September 1997 (available at http://www.isi.edu/div7/rsvp/pub.html). The Internet host uses the RSVP protocol when requesting a certain quality of service QoS from the Internet network on the basis of the communication flow of the application which the Internet host wishes to receive from a remote host. The RSVP protocol transmits the request through the network by using each router user by the network for transmitting the communication flow to the receiving Internet host. In each router, the RSVP protocol tries to make a resource reservation for said communication flow. Also, the RSVP protocol tries to make a resource reservation for the communication flow in the destination and source Internet host.

For making a resource reservation in any node, which may be either a router or an Internet host, the RSVP protocol communicates with two local terminal modules: access confirmation module and protocol module. The access confirmation module deduces whether the node has sufficient resources for providing the requested quality of service. The protocol module deduces if the user has access to make a reservation. If either checking fails, the RSVP protocol returns an error message to the application that formed the request. If both tests are successful, the RSVP protocol sets the parameters for classifying the packet and for scheduling the packet in the Internet source host for achieving the desired quality of service. The classification of the packet deduces for all packets a service quality class, and the scheduling controls the transmission of the packets for achieving the promised quality of service in all communication flows.

The RSVP protocol operates on top of the Internet protocol both in IPv4 and IPv6. In particular, the RSVP protocol is designed to utilise the strong points of the routing algorithms of the present Internet. The RSVP itself does not conduct routing but it uses routing protocols of lower levels to deduce where reservation requests should be transferred. Because the routing changes the routes for complying with changes in the topology of the Internet network, the RSVP protocol places its reservations for resources in new routes, if necessary.

Telecommunication networks and the Internet are two significant worldwide communication networks, whereby wireless telecommunication terminals are developed for coupling therewith and for their use. For example, cellular networks make it possible to couple a wireless telecommunication terminal to a telecommunication network and offer a high quality of service with circuit-switched technology. These cellular networks and other mobile communication networks can be utilised also for coupling to the Internet network and for utilising multimedia services. However, the circuit-switched system has the disadvantages that the connection from a wireless telecommunication terminal to a wireless communication network is turned on during the whole connection, which takes up the capacity of the wireless communication network and limits the number of simultaneous connections.

In solutions of prior art for wireless packet communications, obtaining a quality of service is not supported. Because of this, a development in the Internet community has been started for solutions supporting the mobility of Internet host and obtaining quality of service in the Internet protocol version IPv6.

In radio links, data is typically transmitted in a channel which is a certain frequency range. In one system, several channels can be available simultaneously. Further, in full duplex data transmission there are separate transmitting and receiving channels, whereby for example a base station transmits on the transmitting channel to the terminal device and the terminal device transmits on the receiving channel to the base station. A problem with radio links is that the radio channel is a limited resource which limits e.g. the band width and/or number of channels that can be reserved as well as the data transmission rate available for the radio link. The radio channel is liable to disturbances, such as distortion of the received signal caused by multi-channel propagation which is due to the fact that the same signal is received at the destination through different routes at different times. To reduce the effect of disturbances, part of the data transmission capacity must be used for transmitting error correction data with the packets, and achieving a desired error probability rate may require several packet retransmissions, which reduces the capacity of the radio link.

In radio links where several data transmission flows are transmitted on one channel, packets of these different data transmission flows are multiplexed. The transmission order can be affected by arranging packets of different data transmission flows in an order of priority, whereby packets of a flow with higher priority are transmitted more often than packets of a flow with lower priority. These include packets of a real-time application which are preferably made as short as possible. On the other hand, packets of applications with lower priority are often considerably longer than packets with higher priority. In systems of prior art, such a long packet prevents the transmission of other packets as long as the transmission of the packet takes. This may cause considerable delays also in the transmission of packets with higher priority, and reduce the quality of service.

It is an aim of the present invention to provide a method for flexible determination of the quality of service in wireless communication in the Internet. The method of the invention is primarily characterised in what will be presented in the characterising part of the appended claim 1. The system of the invention is primarily characterised in what will be presented in the characterising part of the appended claim 8. Further, the wireless communication device of the present invention is primarily characterised in what will be presented in the characterising part of the appended claim 14. The invention is based on the idea that for setting up an Internet connection, the required quality of service is determined for the connection, on the basis of which the connection is attempted to make in a wireless communication network with parameters complying with the set quality of service.

The present invention gives significant advantages to the solutions of prior art. In a wireless connection set up by the method of the invention, the quality of service is obtained in a more reliable way, and moreover, the whole capacity of the wireless communication network can be utilised more efficiently, because for some connections it will suffice to have a quality of service which takes up less of the capacity of the communication network. On the other hand, fewer retransmissions will be required in connections where no high demands are set for the correctness of the data transmission, e.g. for the transmission of speech or video between the Internet network and a wireless telecommunication terminal. Thus, more capacity will be left for applications where e.g. the correctness of data transmission is important, such as in the transmission of data files. Data transmission flows are examined in a centralised manner on the Internet protocol level, and a detected data transmission flow is supplemented with the parameters of the quality of service of the radio interface. These parameters are obtained advantageously from a predetermined data file depending on the radio interface. In this centralised definition of quality of service, only two parties are required, and it is possible to better examine active data transmission flows and quality of service levels defined for them, before setting the quality of service for a new data transmission flow. Thus, new connections will not reduce the quality of service of existing connections.

As another advantage, it can be also mentioned that the packet of one data transmission flow does not need to be transmitted as one packet but it can be divided into smaller parts which are, according to the invention, equipped with a label of the radio flow, on the basis of which the receiver can distinguish between packets of different flows and their parts. Thus, between parts of one long packet, it is possible to transmit a packet of a flow requiring higher quality of service. Further, the number of retransmissions can be reduced, because errors occur typically in bursts, whereby not all parts of a long packet are not necessarily erroneous and these do not need to be retransmitted.

Figure 4:
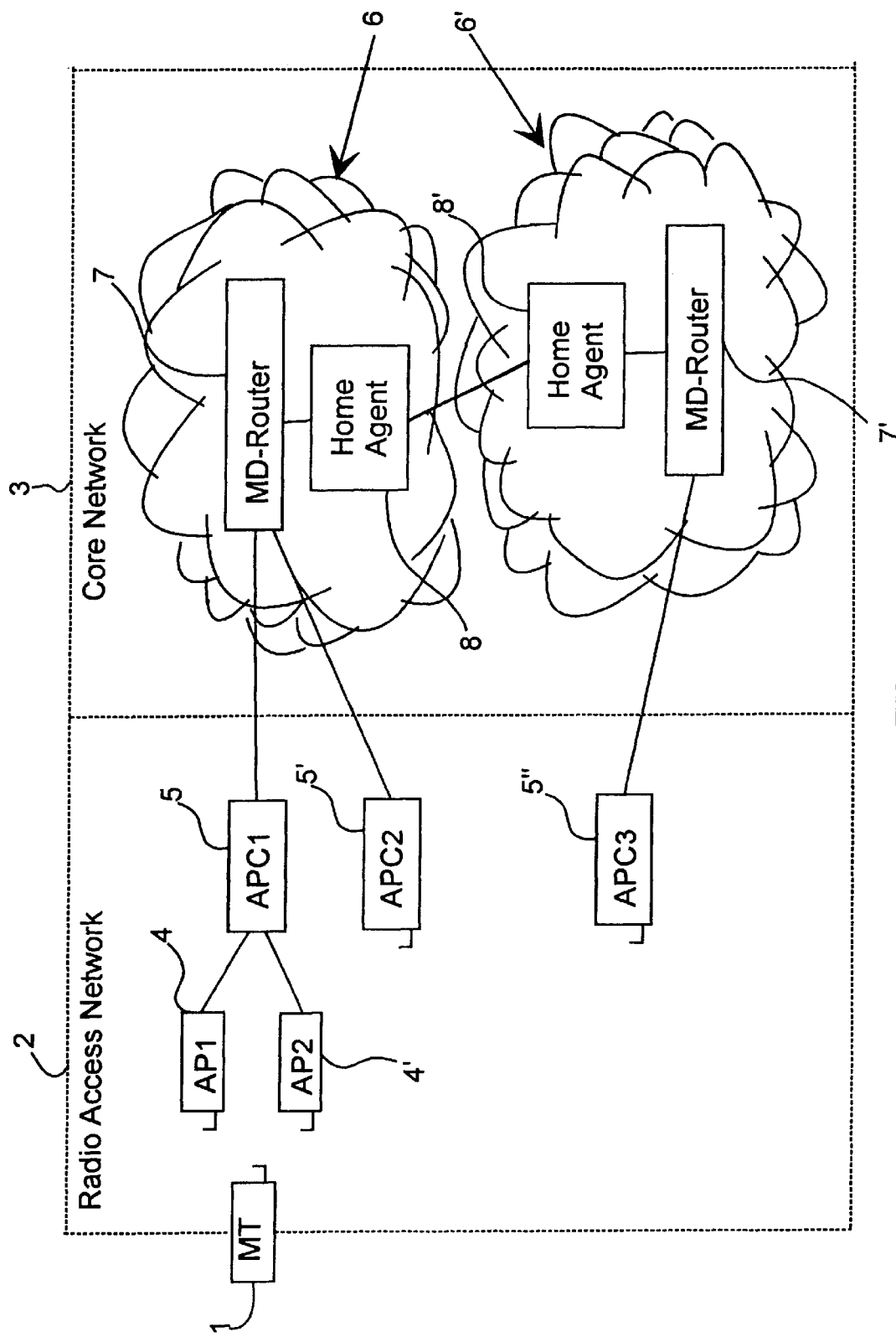
Figure 5:
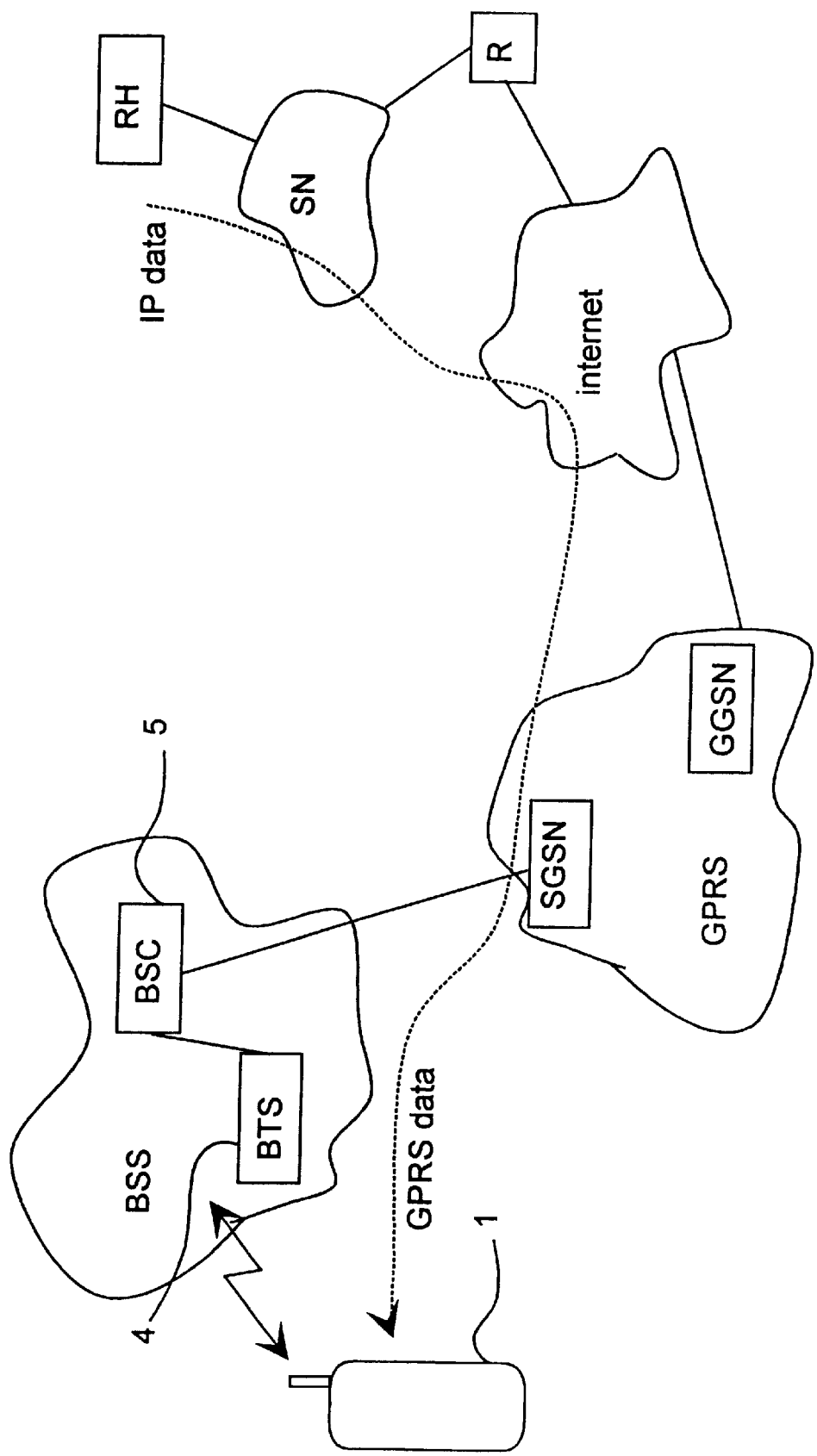
Figure 6:
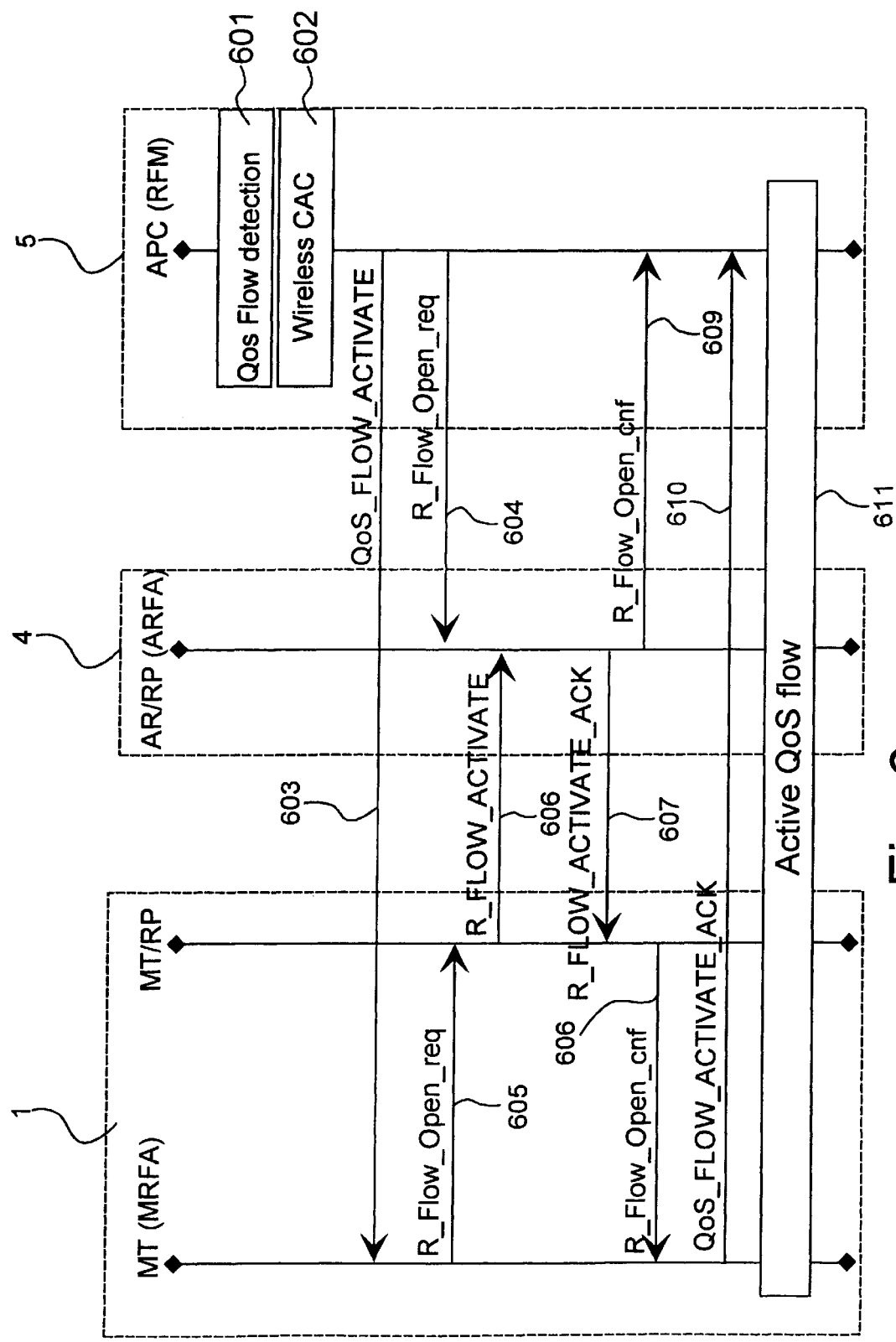
Figure 7A:
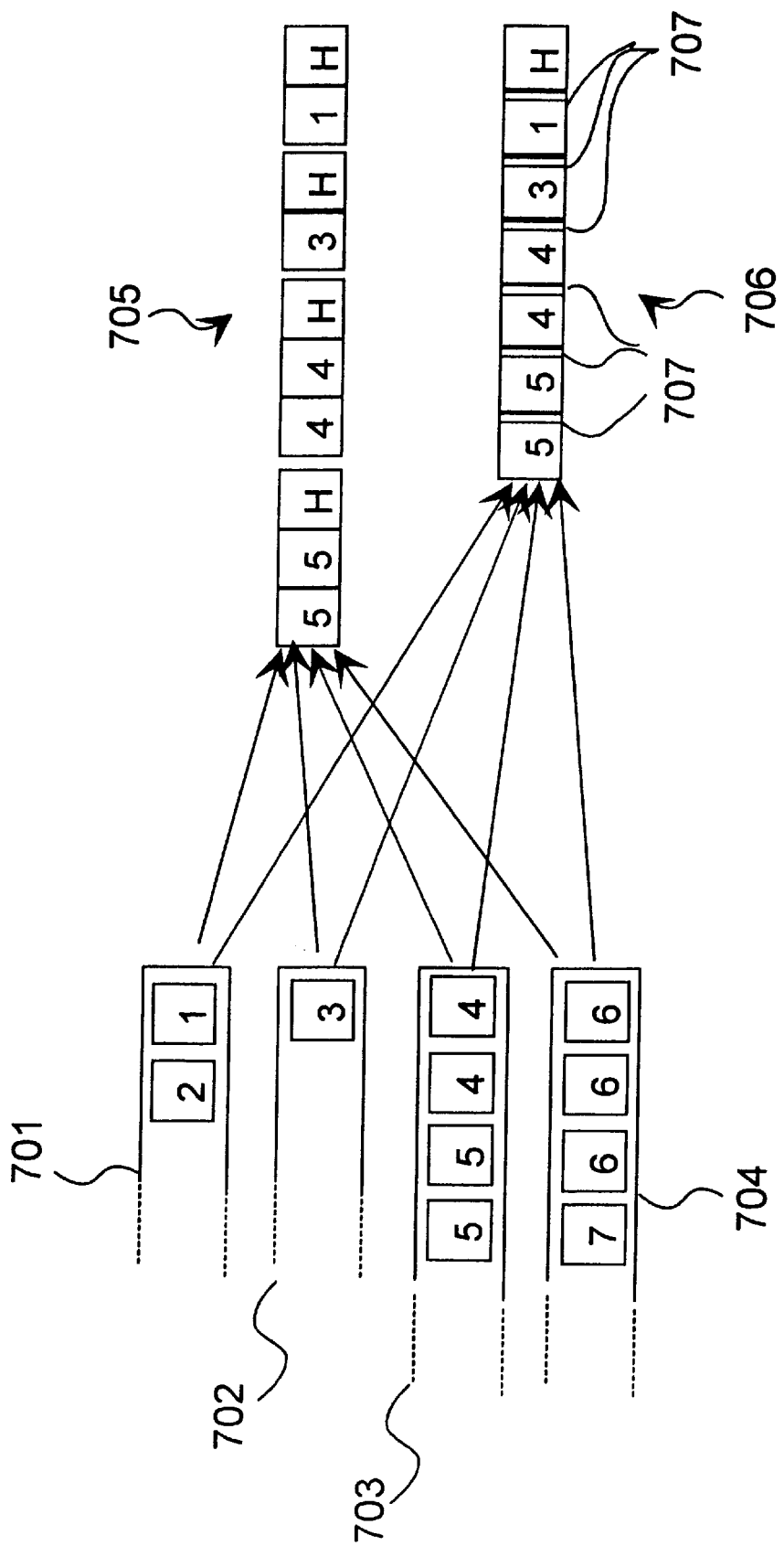
Figure 7B:
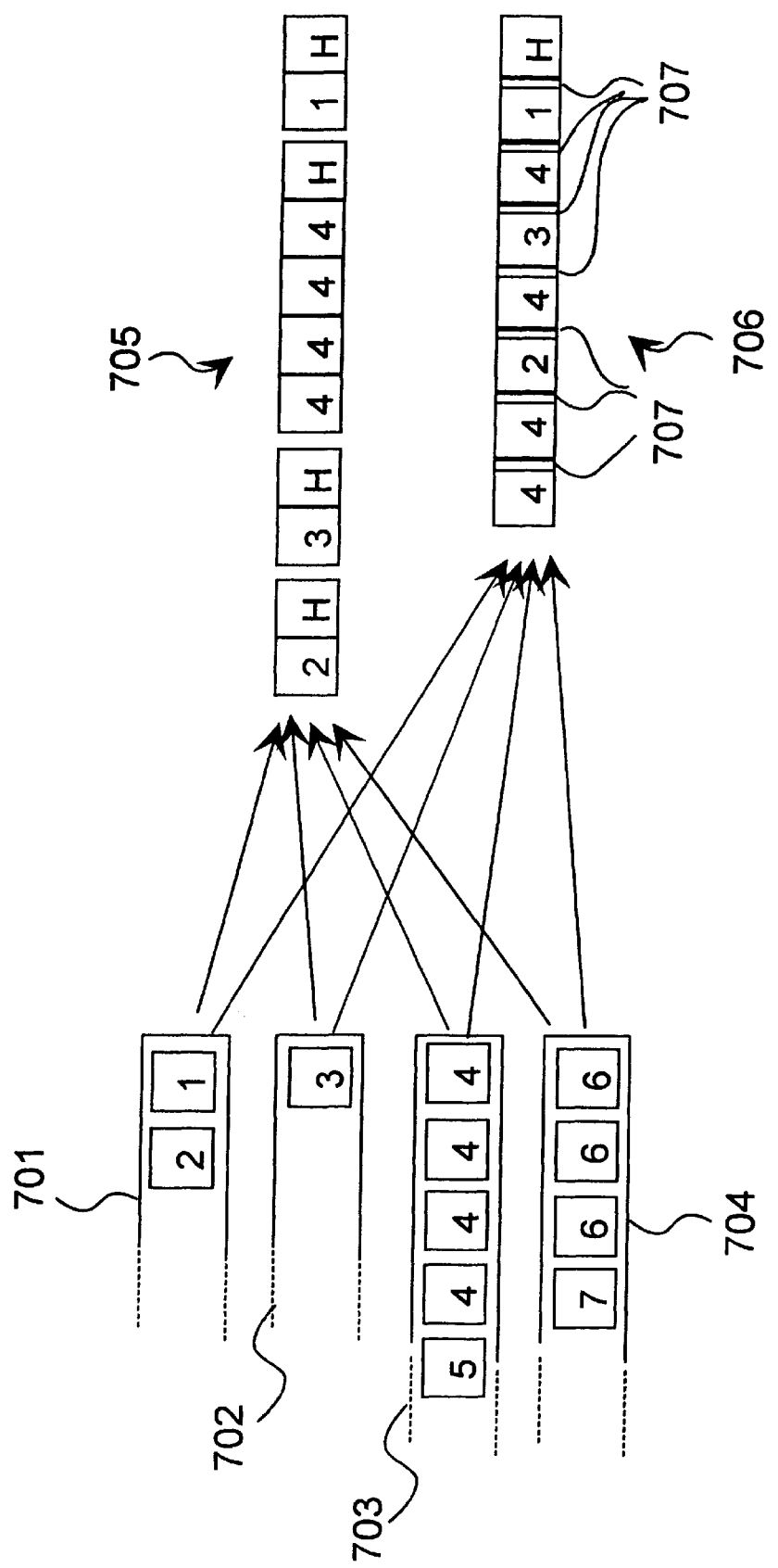

In the following, the invention will be described in more detail with reference to the appended drawings, in which FIG. 1a shows an example of a local area network complying with the HIPERLAN standard in a reduced manner, FIG. 1b illustrates the structure of a data transmission packet complying with the HIPERLAN standard, FIG. 2 illustrates the structure of a packet of the Internet protocol version IPv6, FIG. 3 shows the coupling of a transmitting and receiving host via the Internet network in a reduced chart, FIG. 4 shows the coupling of a wireless Internet host to the Internet network in a reduced chart, FIG. 5 shows packet data transmission between a wireless communication device and the Internet network via the GSM cellular network, FIG. 6 shows an example of generating a radio flow label upon detecting a data transmission flow in a wireless communication network, and FIGS. 7a and 7b show examples of packet transmission sequences according to prior art and upon transmission with a radio flow label according to the invention.

In the following, the invention will be described by using the GSM cellular network as an example of a wireless communication network and a wireless communication device of the GSM system as the wireless Internet host, but the invention can also be applied in other wireless communication networks and wireless telecommunication terminals with the option for data transmission in packets. This wireless communication device 1 can also consist of a computer, such as a portable computer, coupled with a wireless data transmission device, such as a radio modem.

In this specification, data flow refers to the transmission of data packets belonging to the same communication/application. Respectively, wireless data flow refers to the transmission of data packets belonging to the same communication/application, advantageously via the radio channel, whereby also the term radio flow is used. The packets maybe e.g. packets complying with the Internet protocol or GPRS packets of the GSM cellular network. The GPRS packet transmission system provides the possibility of 14 simultaneous connections in one terminal (wireless communication device) at the data transmission level. At present, the GPRS packet transmission offers the possibility of arranging the packets in four different levels of priority. The block reserved for this priority information in the packet can be modified into a block reserved for the radio flow label according to this invention. In case there is a need to form at least as many radio flows as the number of simultaneous connections, the corresponding number of bits are reserved for the radio flow label. Thus, two additional bits will be needed in addition to the priority block.

Each connection may be connected with one application, but the same application may involve also more than one connection. The data transmission flows of these different connections belonging to the same application can be identified by the address and port data of the sender and the receiver in the header of the packets.

FIG. 4 is a reduced chart showing the coupling of a wireless Internet host in the Internet network. The system consists of a wireless communication device 1, a radio access network 2 and a core network 3. The radio access network comprises the operations for accomplishing data transmission between the wireless communication device 1 and the core network 3 as well as for controlling wireless resources, for setting up and down wireless data flows or radio flows, for moving the connection from one control station to another (handover), and possibly also for compressing packets e.g. according to the IPv6 standard. In this example, the functional elements of the radio access network include an access point 4, 4' (AP) and an access point controller 5 (APC). A radio communication is set up between the access point 4 and the wireless communication device 1, for transmitting e.g. signals required for setting up the connection and information during the connection, such as data packets of an Internet application. The access point controller 5 controls over one or several access points 4, 4' and connections set up through them to wireless communication devices 1. The radio access network 2 may comprise several access point controllers 5, 5', 5". In the GSM cellular network, the access point 4, 4' is a base station and the access point controller 5, 5', 5" a base station controller.

The core network consists of nodes connected by wires in the Internet, such as routers and wired Internet hosts.

The core network can be divided into so-called domains. These domains have a server computer or a corresponding router, by means of which the domain can communicate with other domains in the Internet. The Internet hosts in the domain, in turn, are coupled with the router of the domain. FIG. 4 shows a core network with two such domains 6, 6' which are intended for serving wireless communication devices 1. These domains 6, 6' include mobile domain (MD) routers 7, 7' which control the access point controllers 5, 5', 5" coupled with the domain 6, 6'. Mobility is achieved in Internet protocol version 6 by supplementing the protocol with a data transmission method whereby the domains can transmit information from a wireless Internet host that has changed its domain. This data transmission method is called in this specification a home agent. In this context, reference is made to the Internet protocol standard version 6 IPv6, where operation of this home agent is described in more detail. The mobile domain router 7, 7' contains the functional properties of the dynamic host configuration protocol version 6 DHCPv6 and the monitoring of the mobility of the wireless communication device 1 between the access point controllers 5, 5', 5" coupled within the mobile domain 6, 6'. It should be mentioned that in some domains, there may be one or several conventional routers between the mobile domain router 7, 7' and the access point controller 5, 5', 5", even though these possible routers are not shown in the appended FIG. 4. In the GSM cellular network, where the general packet radio service GPRS is used, the element corresponding to the mobile domain router 7, 7' is the serving GPRS support node SGSN. The element corresponding to the home agent in said GSM cellular network is the gateway GPRS support node GGSN.

The network architecture used as an example in this specification gives an outline on how the quality of service can be defined in band-limited radio access networks when coupled with the Internet network. This architecture involves two connection interfaces: the radio interface and the radio access network/core network interface. Thus, the radio interface is generated for communication between the wireless communication device 1 and the access point 4, 4'. In a corresponding manner, the radio access network/core network interface consists of the connection between access point controllers 5, 5', 5" and mobile domain routers 7, 7'.

The user of the wireless communication device 1 can use the Internet network e.g. in a way that an application program, such as a browser, designed for this purpose is turned on in the wireless communication device 1. In the application program, the user of the wireless communication device sets as the destination address the address of a desired Internet server or Internet host, for example the address of the Internet server of the provider of the service with which the user of the wireless communication device has made a subscription to using Internet services. As already presented above in this specification, this Internet address can be given as a four-part octet number string or addresses in text form can be used, whereby a domain name server converts the address from text form into a numerical string according to the Internet protocol.

FIG. 5 is a chart showing a situation where the wireless communication device 1 is coupled to the Internet network via a digital cellular network by using the general packet radio service GPRS. The wireless communication device 1 communicates with an access point 4 on any channel of the frequency range reserved for the system. In the GSM cellular network, this access point 4 is a base transceiver station (BTS) of the base station subsystem (BSS). One access point 4 forms the radio interface of one cell in the cellular network. The access point 4 operates as a transmitter of information to be transmitted between the wireless communication device 1 and the access point controller 5. It is a central function of the access point controller to control the channels in the interface and to transmit the connection from one access point 4 to another access point 4' in a situation when the wireless communication device 1 moves from one cell to another.

Next, data transmission from another Internet host to the wireless communication device 1 will be described. The Internet application of the wireless communication device 1, to which the information is finally transferred, transmits the above-mentioned address to define the source Internet host. The data transmission is conducted according to the GPRS standard from the mobile station 1 to the GSM cellular network. The GSM cellular network converts the packet message to a message complying with the Internet protocol and transmits it to the Internet network. The information formed in the application is transmitted to the wireless communication device 1 according to the Internet protocol via the Internet network in a manner known as such by routing to the GSM cellular network, where the information is converted to comply with the packet transmission mechanisms of the cellular network, in this case into packets of the GPRS network. The information is transmitted further via the access point controller 5 to the access point 4 and further to the wireless communication device 1 where the received message is transferred to the application layer to be processed by the application.

The following is a description on the method according to an advantageous embodiment of the invention for generating a radio flow label in communication between the wireless communication device 1 and the access point 4, 4'. The application is an Internet application of the wireless communication device 1, from which information complying with the Internet protocol is transmitted to the Internet network. This specification does not contain a more detail description on the formation of packets between the wireless communication device 1 and the mobile communication network, which may vary in different mobile communication networks and is prior art known as such by an expert in the field. FIG. 6 is a schematic diagram of this formation of the radio flow label for data transmission between the wireless communication device 1 and the access point controller 5. All data transmission is based on packets and is routed according to the Internet protocol. The mobile terminal radio flow agent (MRFA), which is implemented advantageously in the application software of the wireless communication device 1, starts to transmit radio flow information packets using a default flow ID. At the access point 4, an access point radio flow agent (ARFA) transmits the flow further to the access point controller 5. At the access point controller 5, a router matrix (RM, not shown) transmits the flow to a radio flow manager block (RFM). The access point controller 5 detects that this flow is of the kind for which a radio flow label should be formed for achieving a certain quality of service (block 601 in FIG. 6). The access point controller 5 finds out if there are sufficient resources available at the moment to be used for data transmission between the wireless communication device 1 and the access point 4 in order to achieve the desired quality of service for said flow FID (block 602). If sufficient resources are available, the radio flow manager RFM selects a new flow label for the flow to be transmitted via the access point 4 to the mobile terminal radio flow agent MRFA of the wireless communication device 1. In the selection of the flow label, TCP/IP ports and/or addresses of the source host and the destination host are used. This flow label is for example data of 20 bits transmitted to the wireless communication device 1 via the access point 4. In FIG. 6, this step is indicated by arrow 603, and although it is connected directly from the access point controller 5 to the wireless communication device 1, in practical applications it is transmitted physically via the access point 4. In the wireless communication device 1, this received flow label is processed, and on the basis of this, the wireless communication device 1 generates a shorter flow label, in this application example a flow label of 8 bits, wherein a total of 256 different flow labels can be used simultaneously for different Internet applications in one wireless communication device 1.

The access point controller 5 transmits the same flow label also to the access point 4 (arrow 604); in addition, information can be transmitted here on what kind of a quality of service is desired for this flow.

The shorter flow label generated in the wireless communication device 1, which in this specification will be called the radio flow identification (RFID), is transmitted from the wireless communication device 1 via the radio interface MT/RP of the wireless communication device to the access point 4. As known, each wireless communication device of the cellular network is equipped with a device identification or a corresponding separate identification whereby wireless communication devices of the cellular system can be separated from each other. The radio interface MT/RP of the wireless communication device includes, in a manner known as such, a radio transceiver (not shown) as well as coding/decoding means (not shown), but it will not be necessary to describe this radio interface in more detail in this context. This mobile station identification MSID, which in the GSM system is advantageously the international mobile equipment identity IMEI, is transmitted from the wireless communication device 1 to the access point 4 in connection with the transmission of messages (arrows 605 and 606). Now, the access point 4 has the flow identification FID, the radio flow identification RFID as well as the mobile station identification MSID. After this, on the basis of radio flow identifications RFID coming from the wireless communication device and the mobile station identification MSID, the access point 4 can couple the flow with the original wider flow identification FID. The access point 4 transmits an acknowledgement message to the wireless communication device 1 (arrows 607 and 608) and to the access point controller 5 (arrow 609). After this, also the wireless communication device sends an acknowledgement to the access point controller 5 (arrow 610). Now, there is a connection corresponding with the desired quality of service between the wireless communication device 1 and the access point controller 5 (this is shown by block 611).

Also, the access point controller 5 may receive from the Internet network a data flow addressed to the Internet application of the wireless communication device 1. Thus, the access point controller 5 finds that a flow label can be defined for this flow, whereby the access point controller 5 examines the quality of service desired for the flow and finds out if there are sufficient resources available for achieving and maintaining the desired quality of service. At this point, the access point controller 5 considers also the other radio flows active at the moment and finds out if the desired quality of service can be provided for this flow without risking the quality of service of the active flows. If the quality of service can be achieved, the above-mentioned signalling is conducted, whereby e.g. a flow ID is defined for the radio flow.

In case there are no sufficient resources available on the radio channel for achieving the desired quality of service, it is possible e.g. to continue the radio flow at a level with a poorer quality of service, for example with a transmission of best effort, whereby the source host of the flow is informed of this procedure. If necessary, the user can be inquired if the data is to be transmitted in spite of the lower quality of service or if the data transmission is to be interrupted.

The information transmitted from the second host according to the Internet protocol is transmitted via normal mechanisms of the Internet protocol to the cellular network. In the cellular network, the message is converted to a message corresponding with the packet transmission mechanisms of the cellular network and transmitted to the access point controller 5. The access point controller 5 provides the message with a flow identification FID and transmits the message further to the access point 4. At the access point 4, it is examined on the basis of this flow identification FID what are the corresponding radio flow identification RFID and mobile station identification MSID. Next, the flow identification FID is removed at the access point 4 and replaced by the radio flow identification RFID. This way it is possible to reduce the information to be transmitted along with the packets (in this example 20−8=12 bits), which reduces the load of the radio network and makes it possible to utilise the radio network more efficiently. This is also illustrated in the appended FIG. 7a showing four transmission strings 701, 702, 703, 704 containing packets of radio flows. As examples, the packets of each string are indicated by the number of the connection (1 to 7) to which the packet belongs. Of these strings, the access point controller 5, 5', 5" selects the packet to be transmitted at each time on the basis of predetermined criteria. Prior art is shown by the first transmission sequence 705 where the order of transmission is determined primarily on the basis of priority set for the string. In this example, the order of priority is the following: the highest priority belongs to the string 701, next to the second string 702, third to the string 703, and the lowest priority to the string 704. Header blocks are indicated by letters H in each packet.

Data transmission according to an advantageous embodiment of the invention is illustrated by the second transmission sequence 706. In this situation, the transmission order of the strings 701 to 704 is determined according to the quality of service set for the radio flow corresponding to the string in a way that the higher quality of service is set for the first string 701, the next highest to the second string 702, next to the third string 703, and the lowest quality of service is set to the fourth string 704. The radio flow identifications are indicated in this second transmission sequence 706 with the reference numeral 707.

The wireless communication device 1 receives a packet message according to this transmission sequence and transmits the information contained in it to the corresponding application. The wireless communication device 1 contains also a switching table or the like containing information on the application to which a certain radio flow identification RFID corresponds. Also transmission from the wireless communication device 1 to the Internet network is conducted in a reverse order, applying the same principle.

In the formation of the packet transmission sequence, it is possible to consider e.g. the number of strings 701 to 704, retransmission needs caused by errors, statistical multiplexing for packets of fixed size, an attempt to reduce the average delay, and utilisation of the channel as efficiently as possible.

For defining the quality of service QoS, it is possible to utilise information in the header of the application received in the Internet message. At the present, a standard is under development on how these qualities of service could be presented and what they could be. In any case, a message according to the Internet protocol contains, in the header, information about the type of the application, which can be e.g. an audio application, a video application, a data application, or a combination of these. These applications of different types have different requirements. For example, the real-time processing of audio and video applications usually requires that the packets must be transmitted to the destination within a certain response time or otherwise the packets must be rejected. However, in data transmission, for example in the transmission of program files, it is the correctness, not real-time processing, of data transmission that is important. In presently known methods and cellular networks, it is defined at the design stage, what is the error probability of data transmission, on the basis of which it is possible to select error correction algorithms and to set e.g. a maximum number of retransmissions. All packet information is transmitted according to the same criteria. If any packet is transmitted incorrectly, it is retransmitted. These retransmissions are conducted either as long as the packet is received correctly or, if a response time is defined for the packet, the packet is rejected if it cannot be received within the prescribed time or the maximum number of retransmissions is exceeded. Since in audio and video applications even a partly incorrectly received information would be sufficient, this retransmission constitutes an unnecessary load on the radio network. On the other hand, the additional load reduces the radio resources available for other applications and thus interferes also with the quality of service obtained by other applications. For detecting and correcting errors, several methods have been developed which are prior art to an expert in the field, wherein it is rendered unnecessary to discuss them in more detail in this context. It should be further mentioned that increasing error detection and error correction capacity by error detection and correction algorithms will increase the need of data transmission. These conflicting demands set a limit to the fact how efficient an algorithm is selected, to prevent an unnecessary delay in the data transmission.

When using a method of the invention, it is possible to define different qualities of service with different demands. For example, a poorer error probability demand can be defined for audio and video packets than for data packets. On the other hand, due to the real time demand, a higher priority can be determined for audio and video packets than for data packets. Thus, data packets are transmitted at a slower rate, if the radio network is loaded. Further criteria describing the quality of service may include response time, within which the packet must be received or else it is rejected. By combining these different criteria, several different qualities of service are obtained, and also other criteria than those mentioned above can be used in defining the quality of service.

These qualities of service and the corresponding bits of the header to be examined are e.g. listed in a table by the access point controller 5, whereby by examining these header bits, the access point controller 5 retrieves the corresponding quality of service from the table. For these qualities of service, information is stored in the access point controller 5 on the special demands of each quality of service, including the abovementioned error probability, priority and response time.

These definitions for the quality of service are transmitted from the access point controller 5 to the access point 4 which, on the basis thereof, conducts the definition of the transmission order of the packets to be transmitted. There may be several Internet applications to be transmitted by one access point 4 simultaneously. For these different applications, a string is preferably formed for each, where packets are transferred for transmission. From these packets in different strings, the access point 4 selects the packet to be transmitted at the time.

According to the invention, it is possible to use the radio flow label to improve the efficiency of the system also in a way that the transmission of long packets can be divided into parts so that, if necessary, one or several packets of a higher quality of service are transmitted between the parts. Such a part can be e.g. in a time-division radio link one time period. In systems of prior art, the whole packet must be transmitted in subsequent time periods, because the receiver cannot otherwise identify the flow to which the packet part belongs. In the system of the invention, the packet parts can be identified on the basis of the radio flow identification. This situation is illustrated in the appended FIG. 7b showing four strings. Each string contains one or more packets to be transmitted. The transmission of prior art is illustrated in the first transmission sequence 705, and the transmission of packets equipped with a radio flow identification according to the invention is illustrated in the second transmission sequence 706. Thus, retransmission of so many time periods will not be needed, because, instead of retransmitting the whole packet, only the incorrectly received part or parts of the packet are retransmitted.

Determination of the quality of service according to the invention can be used also in other packet data transmission protocols and information networks. Also, in addition to the routings known from Internet networks, the invention can be applied in coupling solutions developed for Internet networks where the router is used for examining the route between data flows and conducting the coupling in the hardware layer.

The method described above as the method supporting the quality of service is applicable also together with the Internet resource reservation protocol RSVP. Thus, in the access point controller 5, 5', 5" which monitors data transmission flows, it is possible to consider also the data contained in the data transmission flow about the quality of service presented by the host. The radio flow manager block RFM formed in the access point controller 5, 5', 5" stores the parameters of the quality of service requested by the host and finds out whether the requested quality of service is available. If the requested quality of service is available, it is possible to set the parameters corresponding to the desired quality of service for the data flow in question.

The invention is not limited solely to the embodiments presented above, but it can be modified within the scope of the appended claims.

What is claimed is:

1. A method for supporting the quality of service in packet data transmission between a wireless communication device communicating with a radio network, and an information network, where data transmission between the wireless communication device and the radio network is controlled with at least one access point controller, and in which method information is transmitted between the wireless communication device and the access point controller in radio flows, wherein at least one radio flow is provided with a defined radio flow identification and a quality of service, and the quality of service is determined in a centralised manner.

2. The method according to claim 1, characterised in that the quality of service is determined by the access point controller.

3. The method according to claim 1 or 2, characterized in that for determining the quality of service, the content of the packets, preferably the content of the header of the packets, is used.

4. The method according to claim 3, characterised in that the data transmission is divided at least into a network layer and a data link layer, wherein in the method, the data transmission is conducted in packets of the network layer, which are converted into packets of the data link layer to be transmitted in a radio flow, and that the quality of service is determined on the basis of the contents of the packets of the network layer.

5. The method according to claim 1, characterised in that the packets of the radio flow are formed from packets complying with the Internet protocol.

6. The method according to claim 1, characterised in that the packets of the radio flow are transmitted in the radio network (2) as GPRS packets.

7. The method according to claim 1, characterised in that the method comprises the steps of:

transmitting several different radio flows in packet data transmission between the wireless communication device (1) and the radio network (2), and transmitting a packet of a second radio flow between packets of a first radio flow.

8. A system for supporting the quality of service in packet data transmission in a radio network, the system comprising:

at least one wireless communication device communicating with the radio network, means for transmitting information between the radio network (2) and the information network, means for controlling data transmission between the wireless communication device and the radio network, and means for transmitting information between the wireless communication device and the access point controller in radio flows, means for determining a radio flow identification for at least one radio flow, means for determining the quality of service for the radio flow, and means for determining the quality of service in a centralised manner.

9. The system according to claim 8, characterised in that said means for determining the quality of service in a centralised manner comprise the access point controller.

10. The system according to claim 8 or 9, characterised in that it comprises means for determining the quality of service on the basis of the, contents of the packets, preferably the contents in the header of the packets.

11. The system according to claim 8, 9 or 10, characterised in that it comprises means (7, 103) for generating packets of a radio flow from packets complying with the Internet protocol.

12. The system according to any of the claim 8, characterised in that it comprises means for conducting data transmission in the radio network in GPRS packets.

13. The system according to any of the claim 8, characterised in that it comprises:

means for transmitting at least a first and a second radio flow in packet data transmission between the wireless communication device and the radio network, and means for transmitting a packet of the second radio flow between packets of the first radio flow.

14. A wireless communication device equipped with means for transmitting information into a radio network, comprising:

means for transmitting information between a radio network and an information network, means for controlling data transmission between the wireless communication device and the radio network, and means for transmitting information between the wireless communication device and the access point controller in radio flows, means for generating a radio flow identification for at least one radio flow, means for connecting said radio flow identification into packets of said radio flow transmitted from the wireless communication device, and means for transmitting quality of service related information to said radio network for performing the determination of the quality of service for said radio flow in a centralized manner in said radio network.

* * * * *